United States Patent [19]

Körfgen et al.

[11] Patent Number: 5,044,605
[45] Date of Patent: Sep. 3, 1991

[54] FLOW-CONTROL AND SHUTOFF VALVE

[75] Inventors: Harald Körfgen, Fröndenberg; Heinz Hirsch, Soest; Vinzenz Grendel, Hemer, all of Fed. Rep. of Germany

[73] Assignee: Friedrich Grohe Armaturenfabrik GmbH & Co., Hemer, Fed. Rep. of Germany

[21] Appl. No.: 599,706

[22] Filed: Oct. 18, 1990

[30] Foreign Application Priority Data

Oct. 20, 1989 [DE] Fed. Rep. of Germany ....... 3934977

[51] Int. Cl.$^5$ ............... F16K 5/04; F16K 5/18
[52] U.S. Cl. ..................... 251/180; 251/304
[58] Field of Search ............... 251/180, 304; 137/454.5, 454.6

[56] References Cited

U.S. PATENT DOCUMENTS

| 3,273,850 | 9/1966 | Kolze | 251/180 X |
| 3,834,416 | 9/1974 | Parkison | 251/304 X |
| 4,889,157 | 12/1989 | Bergmann | 137/454.5 |

FOREIGN PATENT DOCUMENTS

| 0311598 | 4/1951 | European Pat. Off. | 251/180 |
| 3107431 | 9/1943 | Fed. Rep. of Germany . | |
| 434796 | 6/1934 | United Kingdom | 251/208 |

Primary Examiner—Martin P. Schwadron
Assistant Examiner—Kevin L. Lee
Attorney, Agent, or Firm—Herbert Dubno; Andrew Wilford

[57] ABSTRACT

A valve comprises a housing forming a compartment traversed by an axis and having a radially opening outlet port and an axially open inlet port, a valve plate fixed in the housing and formed relative to a flow direction therethrough with a flat upstream face and with an axially throughgoing valve orifice opening at the face, and a control plate in the housing formed relative to the flow direction with a flat downstream face riding on the valve-plate face, with an axially throughgoing control orifice opening at the face, and with an axially open socket. This control plate is pivotal on the valve plate about the axis for alignment of the orifices and flow through the valve and for misalignment of the orifices for restricted flow through the valve. A large-diameter valve stem rotatable in the housing about the axis is formed with a socket open axially toward the plates and a small-diameter connecting rod extending through the valve plate has an inner end complementary to and rotationally fixed in the valve-stem socket and an outer end rotationally fixed in the control-plate socket. One of the rod ends is axially slidable in the respective socket so that rotation of the stem is transmitted by the rod to the control plate.

13 Claims, 2 Drawing Sheets

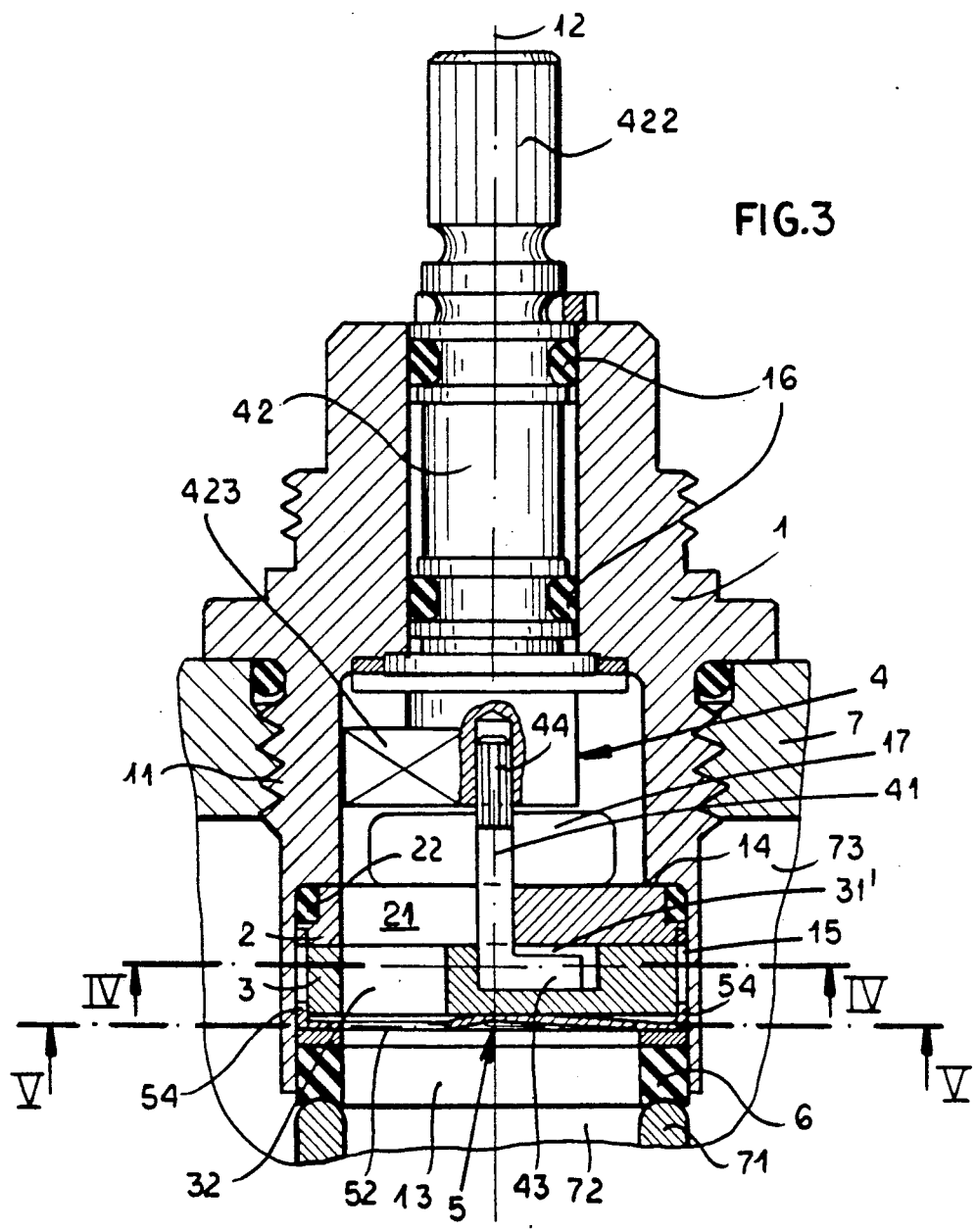
FIG.3
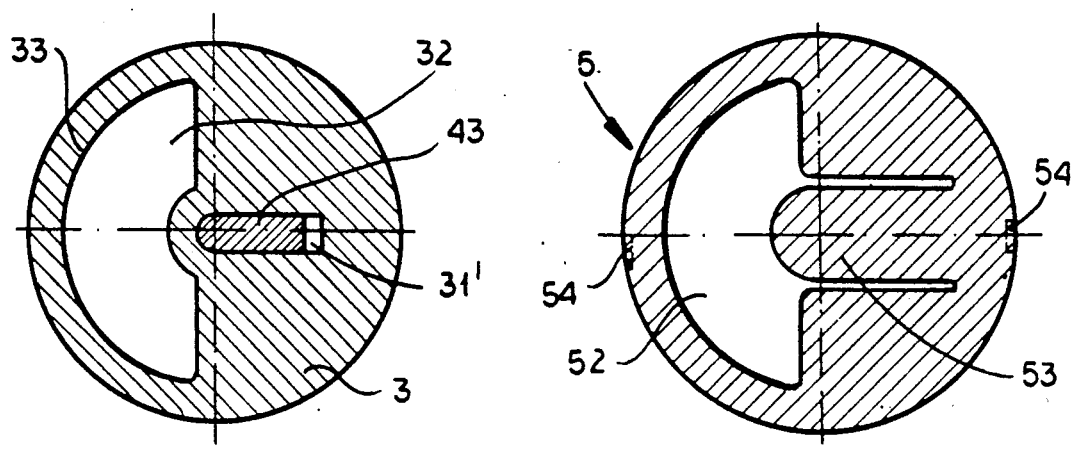
FIG.4
FIG.5

FLOW-CONTROL AND SHUTOFF VALVE

FIELD OF THE INVENTION

The present relates to a valve. More particularly this invention a flow-control and shutoff valve of the type mounted in faucet or like fixture.

BACKGROUND OF THE INVENTION

A standard and shutoff valve of the type described in German document 3,107,431 of W. Orszullok or in commonly owned patent application Ser. No. 07/580,939 filed Sept. 10, 1990 has a housing forming a compartment traversed by an axis and having a radially opening outlet port and an axially open inlet port. Fluid can flow through the compartment in a flow direction from the inlet port to the outlet port in the open condition of the valve A valve plate fixed in the housing is formed relative to the flow direction with a flat upstream face and with an axially throughgoing valve orifice opening at the face and a control plate rotatable in the housing about the axis is formed relative to the flow direction with a flat downstream face riding on the valve-plate face, with an axially throughgoing control orifice opening at the face. This control plate is pivotal on the valve plate about the axis for alignment of the orifices and flow through the valve from the inlet port to the outlet port and for misalignment of the orifices for restricted flow from the inlet port to the outlet port. A combined spring and seal fitted into the inlet port typically press the downstream face of the control plate against the upstream face of the valve plate. The control plate is operated by a valve stem rotatable in the housing about the axis and formed at its inner end with a noncircular projection passing through the control plate and fitting in a complementary recess formed on the downstream face of the control plate.

As a rule, the housing is externally threaded, typically with a ½ inch standard pipe thread, so that it can be screwed directly into a complementarily threaded hole in a fixture such as a faucet that incorporates the valve. The stem itself must be of large enough diameter that a handle or knob can be mounted on it. Thus little room is left in the housing for flow from the inlet port to the outlet port. It is therefore necessary for the manufacturer to make the coupling projection of the valve stem as small as possible in order to minimize the size of the hole in the valve plate and the room it takes up in the flow chamber. The tradeoff is therefore between strength and flow cross section, so that it is rarely possible to achieve a high-volume flow with a valve engineered for a long service life.

OBJECTS OF THE INVENTION

It is therefore an object of the present invention to provide an improved flow-control and cutoff valve.

Another object is the provision of such an improved flow-control and cutoff valve which overcomes the above-given disadvantages, that is which can be used as a valve insert but where there is no loss in strength in the valve stem or in flow capacity.

SUMMARY OF THE INVENTION

These objects are attained in a valve comprising a housing forming a compartment traversed by an axis and having a radially opening outlet port and an axially open inlet port so that fluid can flow through the compartment in a flow direction from the inlet port to the outlet port, a valve plate fixed in the housing and formed relative to the flow direction with a flat upstream face and with an axially throughgoing valve orifice opening at the face, and a control plate in the housing formed relative to the flow direction with a flat downstream face riding on the valve-plate face, with an axially throughgoing control orifice opening at the face, and with an axially open socket. This control plate is pivotal on the valve plate about the axis for alignment of the orifices and flow through the valve from the inlet port to the outlet port and for misalignment of the orifices for restricted flow from the inlet port to the outlet port. According to the invention a large-diameter valve stem rotatable in the housing about the axis is formed with a socket open axially toward the plates and a small-diameter connecting rod extending through the valve plate has an inner end complementary to and rotationally fixed in the valve stem socket and an outer end rotationally fixed in the control-plate socket. One of the rod ends is axially slidable in the respective socket so that rotation of the stem is transmitted by the rod to the control plate.

Thus with this system at the critical region in the valve, that is in the flow compartment, the slim rod, which according to this invention can be made of high-strength steel, transmits rotation from the relatively fat stem to the control plate. This makes it possible to provide relatively large plate orifices and still use a standard-size cast stem. Flow capacity is not sacrificed to strength or vice versa.

According to another feature of this invention the inlet port is of generally the same size and shape as the plates and the stem is of substantially smaller cross-sectional size. Furthermore the one rod end and the respective socket are complementarily polygonal in section or they are formed with interfitting splines.

The housing in accordance with the invention has an external screwthread adapted to be screwed directly into a fitting. This screwthread is a ½ in. screwthread and the rod is about 2 mm in diameter. In addition the rod has opposite to its one end another end that has a laterally projecting foot imparting to the rod an L-shape and the socket in which the foot fits is radially elongated. This radially elongated socket can be formed on an upstream face of the control plate in which case the valve is provided with caulking around the foot in the elongated socket. Alternately the radially elongated socket is formed as a blind pocket on the downstream face of the control plate and no sealant is needed.

In accordance with a further feature of this invention a spring plate fixed against rotation in the housing engages an upstream face of the control plate and is formed with an orifice aligned with the orifice of the valve plate. This spring-plate orifice is of generally the same size and shape as the valve-plate orifice to act as a flow shield as described in the above-cited copending patent application. Furthermore the spring plate is formed with a finger bearing axially generally centrally on the upstream face of the control plate and with an outer rim engaged in the housing and from which the finger extends.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 3 is an axial section through another valve in accordance with this invention; and FIGS. 4 and 5 are sections taken along respective section lines IV—IV and V—V of FIG. 3.

SPECIFIC DESCRIPTION

Figure 1:
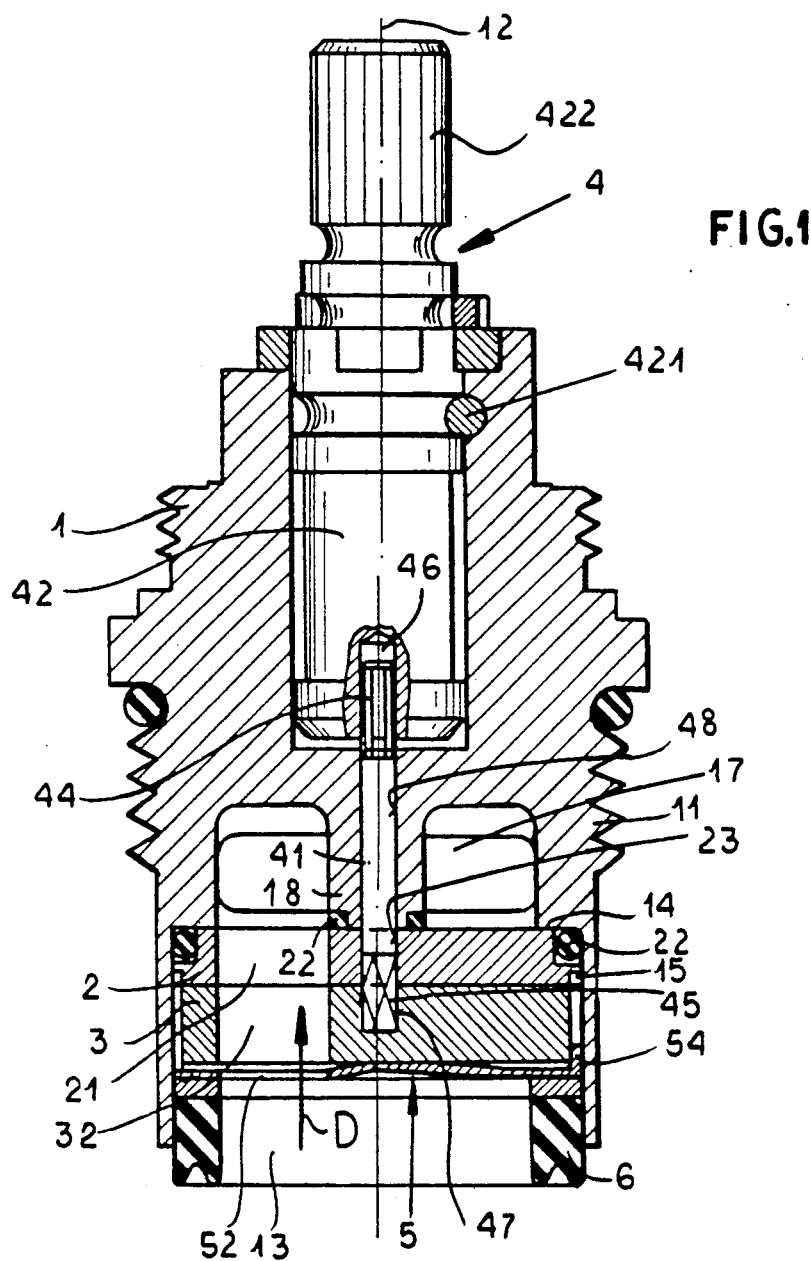
FIG. 1 is an axial section through a valve according to this invention.

As seen in FIG. 1 a valve insert according to this invention has a housing 1 centered on an axis 12 and formed with a ½ in. screwthread 11, with an axially inwardly opening inlet port 13, and a radially outwardly open outlet port 17. Supported on an axially inwardly directed shoulder 14 in this housing 1 is a valve plate 2 formed with a throughgoing semicircular orifice 21 and a central hole 23. The plate 2 has edge ribs fitted in axial grooves 15 in the housing 1 so that it cannot rotate therein about the axis 12 and seals 22 are provided between the outer rim of the plate 2 and the shoulder 14 and in the center of the plate 2 around the hole 23 against a central tubular extension 18 of the housing 1.

A generally circular control plate 3 formed with an axially throughgoing orifice 32 like the orifice 21 rests flatly with its downstream face (relative to a flow direction D) on the upstream face of the plate 2 but can rotate thereon about the axis 12 to align or misalign the orifices 21 and 32 and thereby control flow through the valve.

A spring plate 5 bears axially centrally on the upstream face of the disk 2 and is formed with an orifice 52 identical in shape and size with the orifice 21 and aligned axially therewith. In addition this plate 5 has turned-up rim tabs 54 that engage in the grooves 15 to rotationally fix this spring 5 in the housing 1. An elastomeric seal ring 6 fits against the downstream face of the spring 5 and projects slightly out of the inlet port 13 so that when installed this seal 6 is compressed and holds the plates 2, 3, and 5 axially together.

In accordance with this invention a standard relatively large-diameter cast stem 4 centered on the axis 12 is fitted to the outer part of the housing 1. A pin 421 secures the stem 4 in place against axial movement in the housing 1 while permitting it to rotate about the axis 12. This stem 4 has a splined or fluted outer part 422 adapted to be fitted with a knob or handle and an inner part 42 formed on the axis 12 with an inwardly open splined socket 46. A thin steel rod 41 some 2 mm in diameter extends along the axis 12 and has an outer end 44 complementary to and fitted in the socket 46 and an inner end 45 of polygonal section fitting in a complementarily shaped socket 47 opening on the back face of the control plate 3. This rod 41 passes through the hole 23 in the valve plate 2 so that it couples the stem 4 rotationally to the control plate 3. Between its ends the rod 41 is in effect journaled in a snug bore 48 formed in the housing 1 and its projection 18 and in the central hole 23 of the plate 2.

Figure 2:
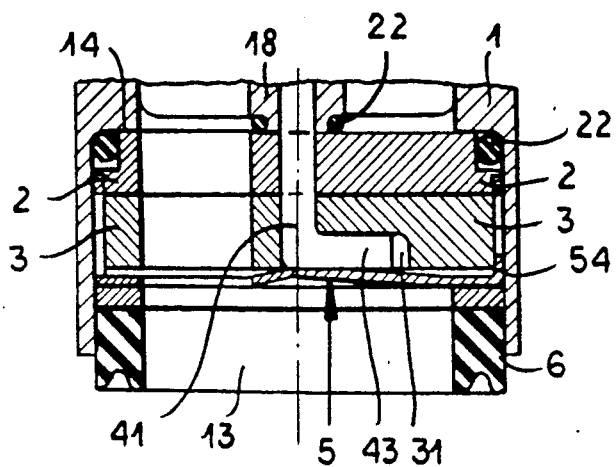
FIG. 2 is a detail view of a variant on the valve of FIG. 1.

FIG. 2 shows a substantially identical arrangement, but where the inner end of the rod 41 is formed with a laterally projecting foot 43 seated in a laterally elongated recess 31 that opens on the back face of the plate 3. This recess 31 is filled with caulk or sealant around the inner end of the rod 41 to prevent leakage at this location.

The system of FIGS. 3 through 5, where reference numerals identical to those of FIGS. 1 and 2 are used for identical structure, has a control plate 3 whose rear face is formed with a pocket 31' into which the foot 43 fits, so no leakage is possible. In addition in this arrangement a stop 423 is provided on the stem 4 to prevent it from rotating completely around about the axis 12. The stem 42 is provided with seals 16 bearing against the housing 1 and is constructed so that it can be pulled out of the port 13 of the housing 1. The orifice 21 is also large enough in this embodiment that the rod 41 passes through it.

Finally as shown in FIG. 5 the valve plate 5 is formed as a circular disk in which the semicircular hole 52 is punched and which is formed with a finger 53 projecting from its rim that is formed with the tabs 54. This finger 53 is bent out of the plane of the spring 5 so that it bears axially centrally on the plate 3.

A major advantage of the assembly of this invention i that it is possible to unscrew the housing 1 from a fixture 7 into which it is threaded and to pull out the seal 6, spring 5, and plates 2 and 3 with the rod 41 and replace any or all of these parts relatively easily. Thus servicing this valve is quite simple.

We claim:

1. A valve comprising:
    a housing forming a compartment traversed by an axis and having a radially opening outlet port and an axially open inlet port, whereby fluid can flow through the compartment in a flow direction from the inlet port to the outlet port;
    a valve plate fixed in the housing and formed relative to the flow direction with a flat upstream face and with an axially throughgoing valve orifice opening at the face;
    a control plate in the housing formed relative to the flow direction with a flat downstream face riding on the valve-plate face, with an axially throughgoing control orifice opening at the face, and with an axially open and radially elongated socket, the control plate being pivotal on the valve plate about the axis for alignment of the orifices and flow through the valve from the inlet port to the outlet port and for misalignment of the orifices for restricted flow from the inlet port to the outlet port;
    a large-diameter valve stem rotatable in the housing about the axis and formed with a socket open axially toward the plates; and
    a small-diameter L-shaped connecting rod formed as a separate element from the valve stem, extending through the valve plate, and having an inner end complementary to, axially slidable, and rotationally fixed in the valve-stem socket and an outer end unitarily formed with a laterally and radially projecting foot received and rotationally fixed in the control-plate socket, whereby rotation of the stem is transmitted by the rod to the control plate.

2. The valve defined in claim 1, further comprising a spring engaged axially against the control plate and pressing same axially against the valve plate; and a seal in the inlet port.

3. The valve defined in claim 1 wherein the inlet port is of generally the same size and shape as the plates, the stem being of substantially smaller cross-sectional size.

4. The valve defined in claim 1 wherein the inner rod end and the respective socket are complementarily polygonal in section.

5. The valve defined in claim 1 wherein the inner rod end and the respective socket are formed with interfitting splines.

6. The valve defined in claim 1 wherein the rod is of high-strength steel, the stem being a casting.

7. The valve defined in claim 1 wherein the housing has an external screwthread adapted to be screwed directly into a fitting.

8. The valve defined in claim 7 wherein the screwthread is a ½ in. screwthread, the rod being about 2 mm in diameter.

9. The valve defined in claim 1 wherein the radially elongated socket is formed as a blind pocket on the downstream face of the control plate.

10. The valve defined in claim 1, further comprising
a spring plate fixed against rotation in the housing and engaging an upstream face of the control plate and formed with an orifice aligned with the orifice of the valve plate.

11. The valve defined in claim 10 wherein the spring-plate orifice is of generally the same size and shape as the valve-plate orifice.

12. A valve comprising:
a housing forming a compartment traversed by an axis and having a radially opening outlet port and an axially open inlet port, whereby fluid can flow through the compartment in a flow direction from the inlet port to the outlet port;
a valve plate fixed in the housing and formed relative to the flow direction with a flat upstream face and with an axially throughgoing valve orifice opening at the face;
a control plate in the housing formed relative to the flow direction with a flat downstream face riding on the valve-plate face, with an axially throughgoing control orifice opening at the face, and with an axially open and radially elongated socket, the control plate being pivotal on the valve plate about the axis for alignment of the orifices and flow through the valve from the inlet port to the outlet port and for misalignment of the orifices for restricted flow from the inlet port to the outlet port, the radially elongated socket being formed on a downstream face of the control plate;
a large-diameter valve stem rotatable in the housing about the axis and formed with a socket open axially toward the plates; and
a small-diameter L-shaped connecting rod extending through the valve plate having an inner end complementary to, axially slidable, and rotationally fixed in the valve-stem socket and an outer end formed with a laterally and radially projecting foot received and rotationally fixed in the control-plate socket, whereby rotation of the stem is transmitted by the rod to the control plate, the valve being provided with caulking around the foot in the elongated socket.

13. A valve comprising:
a housing forming a compartment traversed by an axis and having a radially opening outlet port and an axially open inlet port, whereby fluid can flow through the compartment in a flow direction from the inlet port to the outlet port;
a valve plate fixed in the housing and formed relative to the flow direction with a flat upstream face and with an axially throughgoing valve orifice opening at the face;
a control plate in the housing formed relative to the flow direction with a flat downstream face riding on the valve-plate face, with an axially throughgoing control orifice opening at the face, and with an axially open socket, the control plate being pivotal on the valve plate about the axis for alignment of the orifices and flow through the valve from the inlet port to the outlet port and for misalignment of the orifices for restricted flow from the inlet port to the outlet port;
a spring plate fixed against rotation in the housing and engaging an upstream face of the control plate and formed with an orifice aligned with the orifice of the valve plate, the spring plate being formed with a finger bearing axially generally centrally on the upstream face of the control plate and with an outer rim engaged in the housing and from which the finger extends;
a large-diameter valve stem rotatable in the housing about the axis and formed with a socket open axially toward the plates; and
a small-diameter connecting rod extending through the valve plate having an inner end complementary to and rotationally fixed in the valve-stem socket and an outer end rotationally fixed in the control-plate socket, one of the ends being axially slidable in the respective socket, whereby rotation of the stem is transmitted by the rod to the control plate.

* * * * *